March 28, 1944.  R. L. TWEEDALE  2,345,515
POWER TRANSMISSION
Filed March 8, 1941
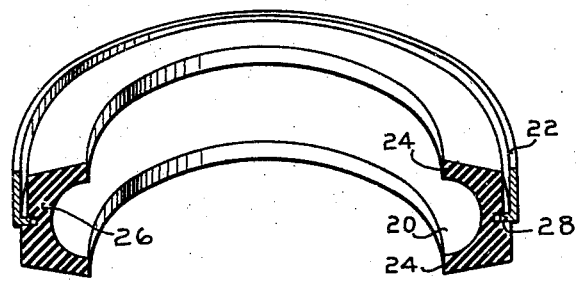
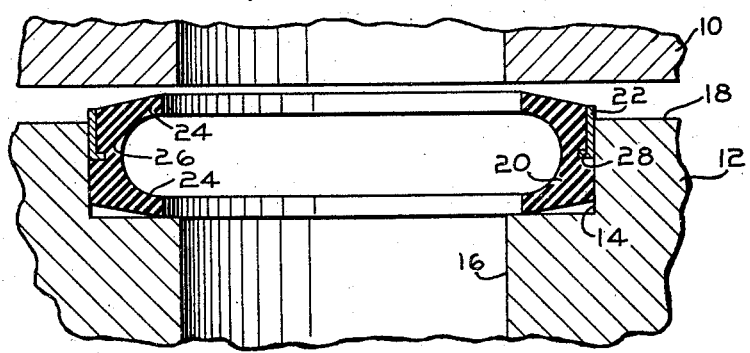
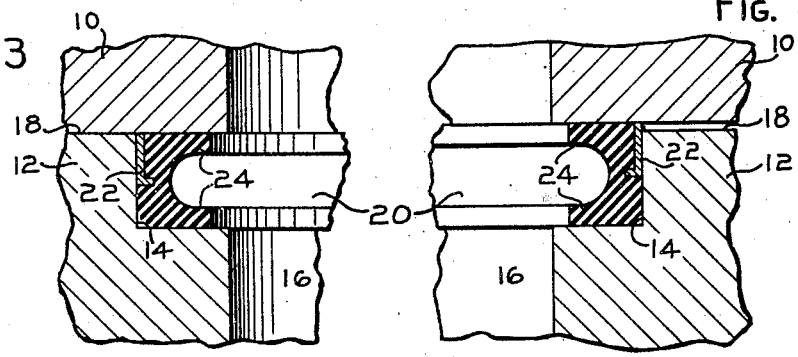
INVENTOR
Ralph L. Tweedale Patented Mar. 28, 1944

2,345,515

UNITED STATES PATENT OFFICE 2,345,515

POWER TRANSMISSION

Ralph L. Tweedale, Detroit, Mich., assignor to Vickers Incorporated, Detroit, Mich., a corporation of Michigan Application March 8, 1941, Serial No. 382,285

1 Claim. (Cl. 285—1)

This invention relates to power transmissions, particularly to those of the type comprising two or more fluid pressure energy translating devices, one of which may function as a pump and another as a fluid motor.

The invention is more particularly concerned with a sealing ring for use in conduit joints used in such transmissions.

In the patent to Joseph A. Martin, No. 2,204,507, there is disclosed a sealing ring formed of semi-hard neoprene and adapted to be positioned in an annular recess surrounding a conduit at the juncture between two separable members. Rings of this character have been very successful in eliminating the many small drips and seepages previously encountered at conduit joints in hydraulic power transmission systems. Such rings have been found to hold a tight seal without the slightest drip or seepage under conditions where previously used constructions would leak badly. As a result of this, some users of these sealing rings have overworked their capabilities and have attempted to use them under such severe conditions as to materially shorten their useful life. For example, the matter of rigidity and resistance to warpage or other separation of the two main members of the conduit joint requires far less attention with such sealing rings than with prior construction. They will hold their seal even though the crack between the two joint members should open up as much as fifteen or twenty thousandths of an inch under warping stresses. Some users, however, have attempted to apply the rings in joints where, due to improper design of the parts, the crack will open up to a greater distance and thus permit the material of the sealing ring to begin to flow through the crack when it is opened under high pressure forces.

For some purposes it is occasionally desirable to utilize a sealing ring of softer material than is usually used and which has a tendency to flow outwardly or extrude through the crack, even though the design of the joint parts be very heavy so that the crack does not open up very wide under warping stresses. With softer or more flowable materials of this nature it is therefore desirable to prevent any possibility of such extrusion into the crack.

It is an object of the present invention to provide an improved sealing ring which will maintain a seal even under such adverse conditions and which will have greater resistance to deformation and ultimate destruction of the sealing ring when used in joints which are subject to comparatively wide openings when subjected to high pressure forces.

It has heretofore been proposed to reinforce the flexible sealing ring with a hard backing or reinforcing member to prevent flow through the joint opening. Where such reinforcing material is of metal, a problem arises due to the characteristics of neoprene and other synthetic rubber-like materials which has heretofore made the use of metallic reinforcements impossible. Such synthetic rubbers, when molded to a given shape and size and thereafter placed in contact with oil, exhibit a tendency to grow in size. This growth tendency varies with different compositions of material, but a significant amount of such growth is present in any material now available on the market.

It is accordingly another object of the invention to provide a reinforcing means for a sealing ring of the character described which may be used successfully with a ring formed of a material subject to growth when in contact with oil.

It is also an object of the invention to provide an improved conduit joint wherein flow or extrusion of the sealing ring into the crack between the two joint halves is absolutely prevented, even though the sealing ring be made of the very soft or flowable material.

Further objects and advantages of the present invention will be apparent from the following description, reference being had to the accompanying drawing wherein a preferred form of the present invention is clearly shown.

In the drawing:

Figure 1 is a perspective view partly in section of a complete sealing ring embodying a preferred form of the present invention and illustrating the condition of the ring parts before growth takes place.

Figure 2 is a cross section of a conduit joint showing the sealing ring after growth has taken place and before the joint is completely assembled.

Figure 3 is a view corresponding to the left half of Figure 2 showing the joint in assembled relationship when not subjected to pressure.

Figure 4 is a view corresponding to the right half of Figure 2 showing the joint in assembled relationship and subjected to pressure.

Referring now to the drawing, there is shown in Figure 2 a portion of a conduit joint which may be similar to that illustrated in the Martin patent above mentioned comprising the two joint halves 10 and 12. The latter has an annular recess 14 surrounding the conduit 16 and a face 18 along which the two halves abut one another.

Positioned in the recess 14 is a sealing ring 20 having a reinforcing ring 22 located around its outer periphery and covering substantially the upper half thereof. The ring in its unflexed condition before assembly of the joint halves is provided with outwardly flaring flexible lip portions 24 which are joined by the back portion 26 which is reinforced by the ring 22. The ring 20 may be formed of neoprene or a similar synthetic or natural rubber-like material and preferably with a durometer hardness in the range of 65 to 85, although softer material may be equally satisfactorily used.

The ring 20 when molded is made smaller than the recess 14 and the reinforcing ring 22. Thus, before the ring 20 is subjected to growth by contact with oil, it appears as in Figure 1 in relation to the reinforcing ring 22. The difference in size between the preliminary and final size is determined by the growth characteristics of the particular material of which the ring 20 is made. Thus, if the ring material has a maximum growth when in contact with oil over an indefinite period of ten per cent, the ring is molded ten per cent smaller than its desired final size and is grown to full size by soaking in oil for a sufficient length of time to achieve its finally grown size or very nearly so. It is preferred to achieve this growth before assembly of the ring to the joint, but this is not essential.

In orer to maintain the reinforcing ring in the proper position on the sealing ring 20 during the time the growth is taking place and thereafter, the ring 22 is provided with an inwardly turned flange 28, and the ring 20 is molded with a groove of corresponding shape to receive the same. Since this groove is located approximately midway between the top and bottom of the ring, the ring growth at this point will be entirely radial and circumferential so that an interlocking relationship can be established between the two rings before growth has taken place, and this interlocking relationship is maintained during the growth period.

When the sealing ring has been assembled in the conduit joint, as shown in Figure 2, the two halves 10 and 12 may be drawn together by suitable bolts or other fastening means, not shown, and the sealing ring will take the form shown in Figure 3. It will be noted that the lips 24 are tightly maintained in contact at their very inner corners with the flat surfaces at the bottom of the recess 14 and at the bottom of the member 10. Fluid pressure applied to the sealing ring tends to tighten this contact and absolutely prevent the flow of oil, even in the minutest quantities, through the crack at surface 18.

Should the joint halves and their fastening means be of such character that a relatively large crack opens up at the surface 18 when pressure is applied to the conduit, the ring follows this movement, as illustrated in Figure 4. Since the rubber-like material of the ring 20 when confined under pressure acts much as a fluid, the reinforcing ring 22 is forced upwardly to follow the movements of the member 10 and in so doing prevents extrusion of the rubber-like material through a crack of almost any width.

While the form of embodiment of the invention as herein disclosed constitutes a preferred form, it is to be understood that other forms might be adopted, all coming within the scope of the claim which follows.

What is claimed is as follows:

A sealing ring for sealing a circular crack between two members confining a fluid such as oil and providing an annular recess adjacent the crack to receive the ring, said ring comprising a body of synthetic rubber subject to growth when in contact with oil and having a shape corresponding to the shape of a portion of the recess and a size smaller than the recess by the maximum amount of growth to which the body is subject, a metal reinforcing ring having its outer diameter sized to fit the recess and its inner diameter larger than the body by the maximum amount of growth to which the ring is subject, and an inwardly turned projection on the reinforcing ring, said body having a recess to receive said projection and hold the reinforcing ring in position both before and after the growth is completed, said projection and recess being of sufficient depth to interlock before growth has occurred whereby separation of the parts before and during growth is prevented.

RALPH L. TWEEDALE.